United States Patent
Bauer

(10) Patent No.: US 8,728,649 B2
(45) Date of Patent: May 20, 2014

(54) BATTERY SYSTEM

(75) Inventor: Ralf Bauer, Neckarsulm (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 608 days.

(21) Appl. No.: 12/559,864

(22) Filed: Sep. 15, 2009

(65) Prior Publication Data

US 2010/0119927 A1 May 13, 2010

(30) Foreign Application Priority Data

Nov. 7, 2008 (DE) .......................... 10 2008 057 430

(51) Int. Cl.
*H01M 10/50* (2006.01)
*H01M 2/16* (2006.01)

(52) U.S. Cl.
USPC ........... 429/120; 429/129; 429/130; 429/146; 429/147; 429/247

(58) Field of Classification Search
USPC .................................................. 429/120, 147
See application file for complete search history.

(56) References Cited

U.S. PATENT DOCUMENTS

| | | | |
|---|---|---|---|
| 1,846,090 A * | 2/1932 | De Loye et al. ............... | 429/147 |
| 2,079,495 A * | 5/1937 | Deibel .......................... | 429/167 |
| 5,456,994 A | 10/1995 | Mita | |
| 5,996,366 A | 12/1999 | Renard | |
| 6,709,783 B2 | 3/2004 | Ogata et al. | |
| 7,264,902 B2 | 9/2007 | Horie et al. | |
| 2001/0007728 A1 * | 7/2001 | Ogata et al. ................... | 429/120 |
| 2003/0008205 A1 * | 1/2003 | Horie et al. ................... | 429/120 |
| 2004/0175610 A1 * | 9/2004 | Moores et al. ................ | 429/120 |
| 2005/0089750 A1 | 4/2005 | Ng | |
| 2010/0151306 A1 * | 6/2010 | Fredriksson et al. .......... | 429/99 |

FOREIGN PATENT DOCUMENTS

| | | |
|---|---|---|
| DE | 90 02 249.1 | 5/1990 |
| DE | 696 12 381 | 10/2001 |
| DE | 10 2007 001 590 | 7/2008 |
| EP | 0522981 | 1/1993 |
| EP | 1 117 138 | 7/2001 |
| EP | 1944824 | 7/2008 |
| JP | 2000-173571 | 6/2000 |
| JP | 2003112770 | 4/2003 |
| JP | 2005332829 | 12/2005 |

* cited by examiner

*Primary Examiner* — Krishnan S Menon
*Assistant Examiner* — Allison Gionta Fitzsimmons
(74) *Attorney, Agent, or Firm* — Gerald E. Hespos; Michael J. Porco; Matthew T. Hespos

(57) ABSTRACT

A battery system with at least one cell having an adjacent temperature-equalizing structure that is provided alternately with the cells and is designed for a medium that carries heat and/or cold to pass through. The cells are individual cells (1, 1', 1"), and the temperature-equalizing structures are conventional corrugated board (2a, 2b, 2c, 2d, 2e, 2'a, 2'b, 2'c, 2'd, 2'e) having two cover layers and at least one corrugation arranged between them for the air to pass through.

15 Claims, 2 Drawing Sheets

BATTERY SYSTEM

CROSS-REFERENCE TO RELATED APPLICATIONS

This application claims priority under 35 USC 119 to German Patent Application No. 10 2008 057 430.0 filed on Nov. 7, 2008, the entire disclosure of which is incorporated herein by reference.

BACKGROUND OF THE INVENTION

1. Field of the Invention

The invention relates to a battery system.

2. Description of the Related Art

Battery systems comprise individual cells, such as lithium-ion or lithium-polymer rechargeable-battery cells. The cells have electrical contacts and are welded in a gas-tight manner into a plastic film that is capable of providing resistance. Cell stacks are formed by arranging a plurality of individual cells in one or more rows. The electrical contacts are connected in series or in parallel.

A specific minimum pressure must act on the cell to prevent gas formation in the interior of a cell. Furthermore, the intrinsic heat created when the cell is being charged and discharged must be dissipated to protect the sensitive cell against damage from excessively high or excessively low temperatures. The power of such a cell decreases sharply at low temperatures. Hence, the cell must be raised to the operating temperature as quickly as possible. Furthermore, a temperature sensor desirably is provided adjacent to a cell to monitor the temperature.

Aluminum sheets have been used for temperature equalization between each of the individual cells to dissipate the intrinsic heat created via heat sinks to an end face of the aluminum sheets. However, relatively thick aluminum sheets are needed to provide adequate heat transport, thus disadvantageously influencing the weight and size of the cell stack. These cell stacks can be used in a motor vehicle. However, the cell stacks have not exhibited a capability to absorb crash energy, and therefore have poor crash characteristics.

Spacers have been used between the individual cells to allow air to flow through and to achieve temperature equalization. However, spacers do not enable a specific minimum pressure to be introduced uniformly to the individual cells. Furthermore, a seal must be provided to prevent the airflow from escaping at the side.

U.S. Pat. No. 7,264,902 discloses a battery system in which cell stacks comprising a plurality of individual cells are each arranged alternately with a temperature-equalizing structure, with a liquid medium which carries heat and/or cold flowing through the temperature-equalizing structure. This arrangement allows the cell stack to be cooled, rather than the individual cells. However, this arrangement is relatively complex, heavy and expensive to manufacture.

The object of the invention is to provide a cost-effective battery system.

SUMMARY OF THE INVENTION

The invention relates to a battery system with temperature-equalizing structures in the form of conventional corrugated board having two cover layers and at least one corrugation arranged between the cover layers to define a medium that carries heat and/or cold to pass through, and are each arranged alternately with the individual cells. The conventional corrugated board may be formed from paper, paper board, cardboard or the like that may be coated with or impregnated with synthetic resin, wax or the like. The cover layers may be formed from synthetic resin, wax, foil or the like. The use of a conventional corrugated board as a temperature-equalizing structure results in a particularly low-cost battery system. Furthermore, the use of conventional corrugated board as a temperature-equalizing structure results in only a very slight increase in weight with only a small additional volume of the battery system. Nevertheless, the specific structure of conventional corrugated board allows very uniform distribution of the surface pressure on the individual cells. Furthermore, the corrugation of conventional corrugated board provides very good insulation between individual cells, thus making it possible to avoid a "thermal cascade". A further advantage is the very good mechanical damping characteristics of conventional corrugated board, thus significantly improving the crash characteristics of a battery system according to the invention in a motor vehicle. In summary, the use of conventional corrugated board as a temperature-equalizing structure between individual cells of a battery system results in a particularly low-cost embodiment that takes account of all the required characteristics.

A conventional low cost mass produced corrugated board preferably is used as a temperature-equalizing structure between the individual cells of the battery system rather than using an expensive structure between the cell stacks of the battery system. The corrugated board can define a single corrugation between an outer and an inner cover layer, or conventional multiple-corrugation corrugated boards. In this latter case, the expression conventional corrugated board also is intended to mean those mass-produced products in which corrugations and cover layers are manufactured from processed, for example wax-impregnated or coated paper and/or plastic film. Embodiments such as these are particularly suitable when a liquid, such as water or oil, is the medium that carries heat and/or cold. Corrugated board made from paper, such as wax-impregnated paper, normally is sufficient when air is used as the medium that carries heat and/or cold and avoids negative influences from moist air. Different types of corrugations can be used in each case, for example graphic corrugation (corrugation height less than 0.6 mm), fine corrugation (2.2 to 3 mm corrugation height) or coarse corrugation (4 to 4.9 mm corrugation height).

The invention will now be explained in more detail with reference to a drawing.

DETAILED DESCRIPTION OF THE PREFERRED EMBODIMENTS

Figure 1:
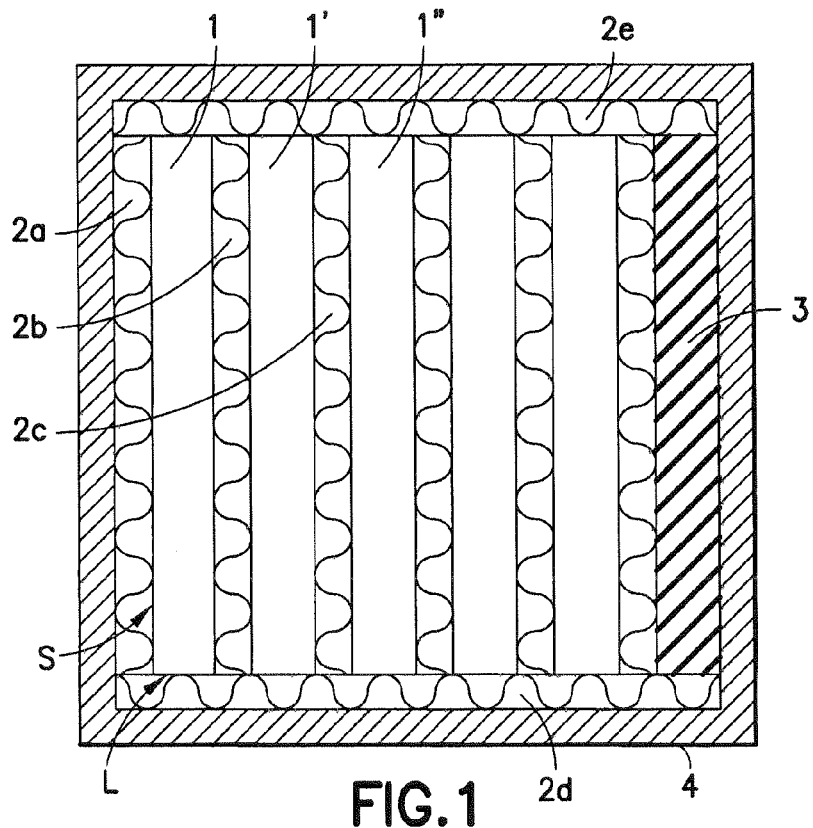
FIG. 1 is a cross sectional view of a battery system according to a first embodiment of the invention.
Figure 2:
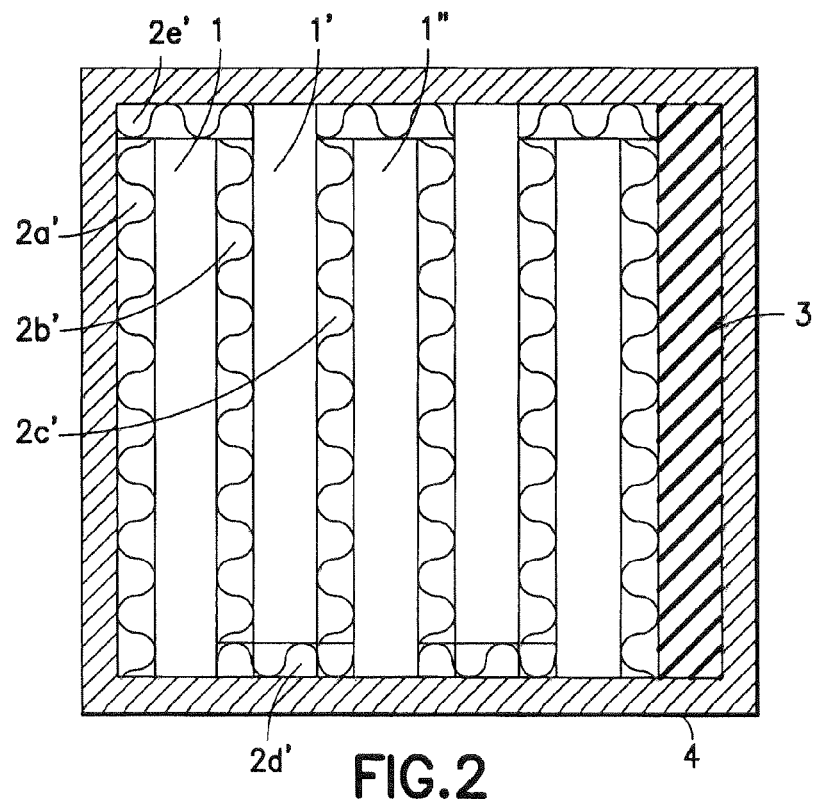
FIG. 2 a cross sectional view of a second variant of a battery system of the invention in which air is used as the medium that carries heat and/or cold.
Figure 3:
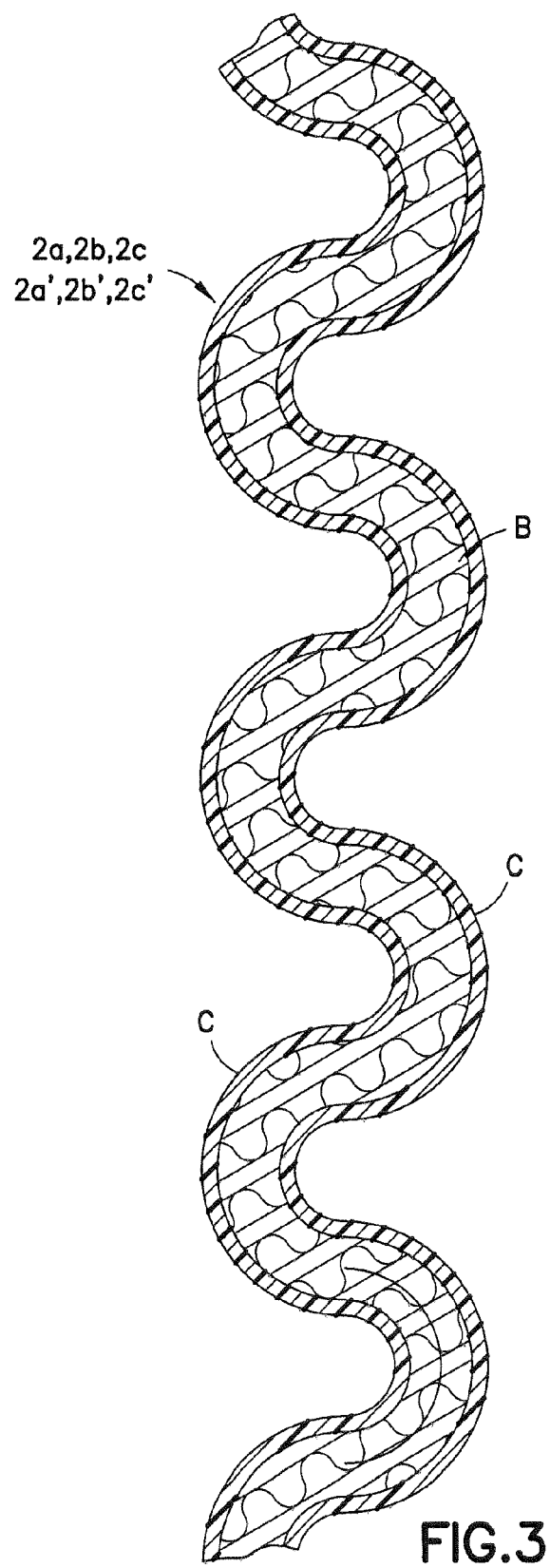

FIGS. 1 and 2 show individual cells 1, 1', 1", . . . provided in a schematically illustrated housing 4. The cells 1, 1', 1", . . . each have opposite side surfaces S, opposite longitudinal end surfaces L and electrical contacts (not shown) to connect the cells 1, 1', 1", . . . in series or in parallel, to form a cell stack of the battery system. Temperature-equalizing elements 2a, 2b, 2c, 2'a, 2'b, 2'c are provided between each of the individual cells 1, 1', 1", . . . and the housing 4. Each temperature-equalizing structure 2a, 2b, 2c, 2'a, 2'b, 2'c comprises a conventional corrugated board B and covers C applied to each of the opposite surfaces of the conventional corrugated board B, as shown in FIG. 3. Thus, each temperature-equalizing structure 2a, 2b, 2c, 2'a, 2'b, 2'c has an alternating arrangement of peaks and valleys. The peaks are substantially tangent to the adjacent battery cell 1, 1' 1". . . and the valleys are spaced from the adjacent cell 1, 1' 1". . . to define cooling medium channels for air or other cooling medium. The conventional corrugated boards B are formed, for example, of paper, paper board or cardboard and the covers C may be wax or plastic coated, laminated or otherwise applied on each side conventional corrugated board B. Each corrugation of each temperature-equalizing structure 2a, 2b, 2c, 2'a, 2'b, 2'c is provided so that air can enter on one end of the corrugation, can flow along the extent of one individual cell between the cell 1, 1' 1" and the cover C, and can emerge on the other end of the corrugation. In the illustrated first and second variants, the flow direction of the air is at right angles to the plane of the drawing. Suitable inlet and outlet guides (not illustrated) are provided in the housing 4 for this purpose. The elements composed of conventional corrugated board also act as spacers between the individual cells 1, 1', 1", . . . , transmit a required surface pressure to avoid gas formation in the interior of an individual cell, and guide the air flowing along the corrugation. Furthermore, the structural design of conventional corrugated board provides good absorption for impacts or blows that occur on the illustrated battery system.

According to the first variant, as illustrated in FIG. 1, side elements 2a, 2b, 2c, . . . are panels composed of conventional corrugated board and are of approximately the same size as the side surfaces S of an adjacent individual cell 1, 1', 1". The individual cells 1, 1', 1", . . . are arranged alternately with the side elements 2a, 2b, 2c to define a cell stack of the battery system. End elements 2d, 2e in the form of panels composed of conventional corrugated board extend along the longitudinal end surfaces L of the individual cells, and are approximately the same size as the longitudinal extent of the alternate arrangement of conventional corrugated board and individual cells. The end elements 2d, 2e in the form of panels composed of conventional corrugated board 2d, 2e are provided to compensate for thermal expansion and to dampen shocks and impacts.

A second variant is illustrated in FIG. 2, and has a meandering structure around the individual cells 1, 1', 1", . . . More particularly, the conventional corrugated board is passed between the side surfaces S of the individual cells 1, 1', 1", . . . and in each case is provided alternately along upper and lower longitudinal end surfaces L of an individual cell. In this case it is possible to use a long, integral web of conventional corrugated board. It is also possible to provide separate side elements 2'a, 2'b, 2'c, . . . composed of conventional corrugated board between the side surfaces S of adjacent individual cells 1, 1', 1", . . . and to provide separate end elements 2'd, 2'e, . . . in the form of panels composed of conventional corrugated board alternately on the upper and lower longitudinal end surfaces L of respective individual cells 1, 1', 1" . . . . In this case, the end elements 2'd, 2'e . . . are panels of a size that corresponds approximately to the extent of an end surface of a respective individual cell 1, 1', 1", . . . plus twice the thickness of the conventional corrugated board that is used to cover the side surfaces a respective individual cell 1, 1', 1", . . . as illustrated in FIG. 2. FIG. 2 also shows that the individual cells 1, 1', 1", . . . of the second variant each are shifted longitudinally with respect to one another by the respective thickness of the end elements 2'd, 2'e, . . . .

An elastic material 3 is provided in each of the two variants on at least one side face S of one individual cell or one side element that is in the form of a panel comprised of conventional corrugated board to transmit surface pressure reliably to the individual cells 1, 1', 1", . . . . The elastic material 3, for example rubber, foam or a spring mechanism, allows a required minimum pressure to be transmitted reliably to the alternating sequence of individual cells and conventional corrugated board.

The two illustrated variants of the battery system according to the invention should be understood only as being examples. Modifications and combinations are possible, particularly with regard to the illustrated elements in the form of panels composed of conventional corrugated board, without departing from the scope of the invention.

What is claimed is:

1. A battery system comprising: a housing having opposite first and second side walls and opposite first and second end walls extending between the first and second side walls; a plurality of cells disposed in the housing, each of the cells having two opposite side surfaces aligned parallel to the side walls of the housing and opposite longitudinal end surfaces facing the end walls of the housing; side temperature-equalizing elements disposed adjacent each of the two opposite side surfaces of each of the cells to define an alternating arrangement of the side temperature-equalizing elements and the cells, so that each of the side surfaces of each of the cells has one of the side temperature-equalizing elements adjacent thereto, first and second end temperature-equalizing elements extending along inner surfaces of the respective first and second end walls and adjacent the longitudinal end surfaces of the individual cells, the temperature-equalizing elements being corrugated boards with two cover layers, at least one corrugation being arranged between the cover layers so that a cooling or heating medium can pass through a space between the cover layers; and an elastic panel between an inner surface of the first side walls of the housing and an adjacent one of the side temperature-equalizing elements, the elastic panel transmitting surface pressure to the alternating arrangement of individual cells and the corrugated boards defining the side temperature-equalizing elements, and wherein the temperature-equalizing elements provide mechanical dampening and impact cushioning for protecting the cells in a crash.

2. The battery system of claim 1, wherein each temperature-equalizing element has a size equal to a size of the side surface of an adjacent individual cell.

3. The battery system of claim 1, wherein each of the end temperature-equalizing elements has the same size as the longitudinal extent of the alternating arrangement of the side temperature-equalizing element and the individual cells.

4. The battery system of claim 1, wherein the end temperature-equalizing elements extend alternately along opposite longitudinal ends of adjacent individual cells.

5. The battery system of claim 4, wherein each of the side temperature-equalizing elements is joined integrally to at least one of the end temperature-equalizing elements.

6. The battery system of claim 1, further comprising at least one temperature sensor in one of the temperature-equalizing elements.

7. The battery system of claim 1, wherein the corrugated board is formed from paper and the cover layers are formed from plastic.

8. A battery system comprising:
a housing;
a plurality of spaced apart cells in the housing, each of the cells having opposite side surfaces that are parallel to one another and opposite first and second longitudinal end surfaces extending between the side surfaces, the cells being arranged so that the side surfaces of the respective cells are parallel to one another; and a plurality of parallel side temperature-equalizing elements arranged so that each of the side surfaces of each of the cells has one of the side temperature-equalizing elements adjacent thereto, end temperature-equalizing elements engaging the opposite longitudinal end surfaces of the cells and engaging inner surfaces of the housing, each of the temperature-equalizing elements comprising a corrugated board with a corrugated sheet and cover layers covering opposite corrugated surfaces of the corrugated sheet so that cooling medium channels are defined between the cover layers of each of the temperature-equalizing elements and in proximity to an adjacent one of the cells, the corrugated sheets being formed from paper or paperboard and each of the side temperature-equalizing elements has a size equal to a size of the side surface of each of the cells adjacent thereto, wherein the temperature-equalizing elements provide mechanical dampening and impact cushioning for protecting the cells in a crash.

9. The battery system of claim 8, further comprising at least one end temperature-equalizing element extending along at least one longitudinal end surface of the cells.

10. The battery system of claim 9, wherein the at least one end temperature-equalizing element comprises two end temperature-equalizing element at opposite longitudinal end surfaces of the cells.

11. The battery system of claim 10, wherein each of the end temperature-equalizing elements has a size to cover the first longitudinal ends of all of the side temperature-equalizing element and adjacent ends of the cells.

12. The battery system of claim 9, wherein each of the side temperature-equalizing elements is joined integrally to at least one of the end temperature-equalizing elements.

13. The battery system of claim 8, wherein the corrugated board is formed from paper and the cover layers are formed from plastic.

14. A battery system comprising:
a housing;
an alternating arrangement of battery cells and temperature equalizing elements in the housing, each of the cells having two opposite side surfaces and the alternating arrangement being configured so that each of the side surfaces of each of the cells has one of the side temperature-equalizing elements adjacent thereto, each of the temperature equalizing elements being a corrugated board with a corrugated sheet of coated or uncoated paper board or paper having alternating peaks and valleys, the corrugated board further having covers secured to the peaks so that the peaks are substantially tangent to the covers and the covers engage an external surface of one of the battery cells, the valleys being spaced from the covers and from the external surfaces of the battery cells to define cooling medium channels between the valleys and the covers and substantially adjacent the battery cells to provide mechanical dampening to resist damage in a crash; and
an elastic material in the housing and between at least one wall of the housing and the alternating arrangement of battery cells and temperature equalizing elements, the elastic material transmitting a sufficient surface pressure to the alternating arrangement of battery cells and temperature equalizing elements in the housing to avoid gas formation in the cells.

15. The battery system of claim 14, wherein the covers of each of the corrugated boards are formed from paper, coated paper or plastic.

* * * * *